US012468325B2

(12) United States Patent
Makinwa et al.

(10) Patent No.: US 12,468,325 B2
(45) Date of Patent: Nov. 11, 2025

(54) REFERENCE CURRENT SOURCE

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Kofi Afolabi Anthony Makinwa, Delft (NL); Zhong Tang, Delft (NL)

(73) Assignees: DENSO CORPORATION, Kariya (JP); MIRISE Technologies Corporation, Nisshin (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 18/539,388

(22) Filed: Dec. 14, 2023

(65) Prior Publication Data

US 2024/0255975 A1 Aug. 1, 2024

(30) Foreign Application Priority Data

Jan. 31, 2023 (JP) ................................ 2023-012933

(51) Int. Cl.
*G05F 1/30* (2006.01)
*G05F 1/56* (2006.01)

(52) U.S. Cl.
CPC .................................... *G05F 1/561* (2013.01)

(58) Field of Classification Search
None
See application file for complete search history.

(56) References Cited

U.S. PATENT DOCUMENTS 6,160,391 A 12/2000 Banba
6,323,630 B1 11/2001 Banba
6,351,111 B1 * 2/2002 Laraia ..................... G05F 3/267 323/907
6,680,643 B2 * 1/2004 Conte ....................... G05F 3/30 327/539
7,256,643 B2 * 8/2007 Pan ........................... G05F 3/30 327/512
7,342,390 B2 * 3/2008 Tachibana ................. G05F 3/30 323/316

(Continued)

*Primary Examiner* — Jeffrey S Zweizig
(74) *Attorney, Agent, or Firm* — POSZ LAW GROUP, PLC

(57) ABSTRACT

A reference current source includes first and second semiconductor elements, a conversion resistor, an amplifier, and a current mirror circuit. The first semiconductor element includes a single diode or a single transistor, and the second semiconductor element includes diodes or transistors connected in parallel. The conversion resistor converts forward voltages of the first and second semiconductor elements or a differential voltage between the first and second semiconductor elements into a converted current. The amplifier has first and second input terminals. The first semiconductor element is connected between the first input terminal and a ground, and the second semiconductor element and the conversion resistor is connected between the second input terminal and the ground. The current mirror circuit outputs a reference current corresponding to the converted current. The conversion resistor has a temperature coefficient being on a level with a temperature coefficient of the differential voltage.

4 Claims, 6 Drawing Sheets

(56) References Cited

U.S. PATENT DOCUMENTS

| | | | | |
|---|---|---|---|---|
| 7,511,566 | B2 * | 3/2009 | Matsuda | G05F 3/30<br>327/539 |
| 8,575,912 | B1 * | 11/2013 | Tung | G05F 3/30<br>323/907 |
| 9,018,934 | B2 * | 4/2015 | Chang | G05F 3/30<br>323/311 |
| 9,164,527 | B2 * | 10/2015 | Huang | G05F 3/30 |
| 9,397,562 | B1 * | 7/2016 | Arakawa | H02M 3/07 |
| 10,371,582 | B2 * | 8/2019 | Obayashi | G01K 7/01 |
| 10,983,547 | B1 * | 4/2021 | Ivanov | G05F 3/267 |
| 11,068,011 | B2 * | 7/2021 | Tai | G05F 3/30 |

* cited by examiner $$I_{REF} = \frac{\Delta V_{be}}{R}$$

REFERENCE CURRENT SOURCE

CROSS REFERENCE TO RELATED APPLICATION

This application is based on Japanese Patent Application No. 2023-012933 filed on Jan. 31, 2023, the disclosure of which is incorporated herein by reference.

TECHNICAL FIELD

The present disclosure relates to a reference current source that outputs a reference current.

BACKGROUND

A reference current source may supply, for example, a current flowing through a shunt resistor used in a current sensor. The current may serve as a reference for an analog circuit in, for example, an analog-to-digital (A/D) converter. It may be desirable that such a reference current source can output a reference current with a fixed value that is not affected by a temperature. In other words, it may be desirable that such a reference current source can output a current without any temperature characteristic. A structure for suppressing the temperature characteristic of the reference current source may be provided.

SUMMARY

The present disclosure describes a reference current source that includes first and second semiconductor elements, a conversion resistor, an amplifier, and a current mirror circuit.

DETAILED DESCRIPTION

Figure 1:
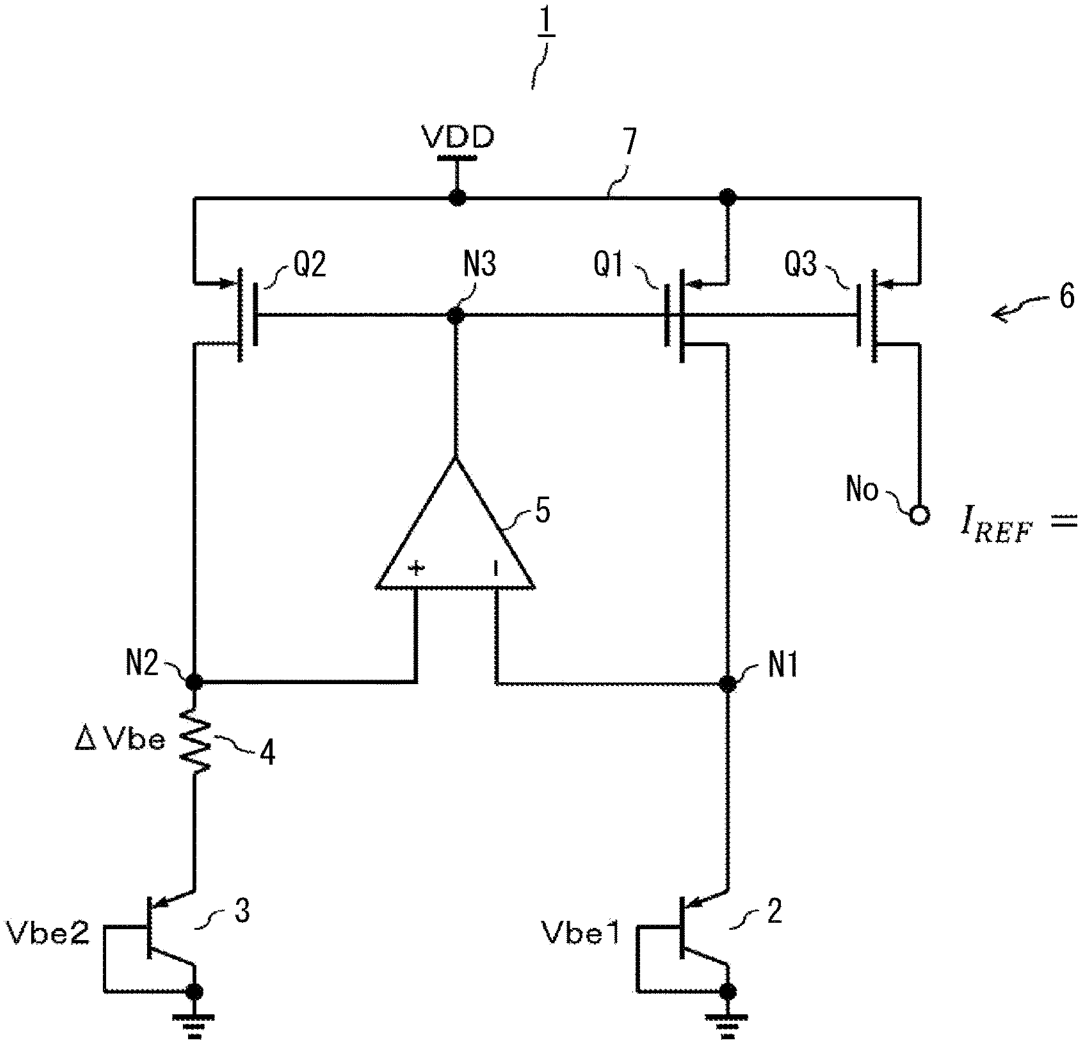
FIG. 1 schematically shows a configuration of a reference current source according to a first embodiment.

The following describes a structural example for suppressing a temperature characteristic of a reference current source. The structural example may generate a reference current Iref with a temperature characteristic that is approximately zero based on a difference voltage $dV_F$, which is the difference between the forward voltage $V_{F1}$ of a single diode and the forward voltage $V_{F2}$ of multiple diodes, where the forward voltage $V_{F2}$ is varied with the current density, specifically with multiple diodes connected in parallel. The differential voltage $dV_F$ is expressed by the following equation (A), where: k is the Boltzmann constant; T is the absolute temperature; q is the amount of charge of electrons; and N is the number of the multiple diodes connected in parallel.

$$dV_F = V_{F1} - V_{F2} = \frac{kT}{q}\ln(N) \tag{A}$$

A current mirror circuit having a first PMOS transistor, a second PMOS transistor, and a third PMOS transistor may be provided. The first PMOS transistor is used for supplying a current to the single diode. The second PMOS transistor is used for supplying a current to the multiple diodes connected in parallel. The third PMOS transistor is used for outputting the reference current Iref. Currents I1 and I2 flowing through each of the first PMOS transistor P1 and the second PMOS transistor P2 have equal values as shown in equation (B) as follows. In this case, the reference current Iref is expressed by the following equation (C), where: I2A is the current flowing through the series circuit of the first resistor and the single diode; I2B is the current flowing through the second resistor connected in parallel to the above-mentioned series circuit; R1 is the resistance value of the first resistor; and R2 is the resistance value of the second resistor.

$$I1 = I2 \tag{B}$$

$$Iref = I2 = 12A + 12B = \frac{dV_F}{R1} + \frac{V_{F1}}{R2} \tag{C}$$

The voltage difference $dV_F$ exhibits a positive temperature characteristic, and the forward voltage $V_{F1}$ exhibits a negative temperature characteristic, as represented by equations (D) and (E), respectively.

$$\frac{\partial dV_F}{\partial T} = \frac{k}{q}\ln(N) \tag{D}$$

$$\frac{\partial V_{F1}}{\partial T} \approx -\frac{1.5\text{ mV}}{K} \sim -\frac{2\text{ mV}}{K} \tag{E}$$

Based on these considerations, the temperature characteristic of the reference current Iref can be expressed as shown in following equation (F).

$$\frac{\partial Iref}{\partial T} = \frac{\partial dV_F}{\partial T}\frac{1}{R1} + \frac{\partial V_{F1}}{\partial T}\frac{1}{R2} \tag{F}$$

As each of the constant values of N, R1, R2 is set to an arbitrary value, it is possible to set the temperature characteristic of the reference current Iref to approximately zero by cancelling the positive temperature characteristic of the differential voltage $dV_F$ and the negative temperature characteristic of the forward voltage $V_{F1}$. In other words, it is possible to cancel out the temperature characteristics.

In a case where the above structural example is made into an integrated circuit (IC), in consideration of an area efficiency, the first resistor may generally be a non-silicide resistor. The temperature characteristic of the non-silicide resistor is, for example, about 0.01%/K, which is relatively small. Therefore, when a non-silicide resistor is used as the first resistor, it may be impossible to cancel the temperature characteristics using only the differential voltage dVf and the first resistor. In the structural example, in order to cancel the temperature characteristics, adding a fourth resistor and a second resistor may be required so that the circuitry size may increase. The fourth resistor is connected to the first diode in parallel. The second resistor is connected in parallel to a series circuit having the first resistor and the second diode.

In the above structural example, as shown in the equation (F) above, the value of the forward voltage $V_{F1}$ is influenced by the value of the reference current Iref. Therefore, if the absolute value of the forward voltage $V_{F1}$ fluctuates due to stress applied to, for example, the IC package, it is possible that the precision of the reference current Iref cannot be maintained satisfactorily.

According to an aspect of the present disclosure, a reference current source includes first and second semiconductor elements, a conversion resistor, an amplifier, and a current mirror circuit. The first semiconductor element includes a single diode or a single diode-connected bipolar transistor. The second semiconductor element includes multiple diodes connected in parallel or multiple diode-connected bipolar transistors connected in parallel. The conversion resistor converts forward voltages of the first semiconductor element and the second semiconductor element into a converted current, or converts a differential voltage into a converted current. The differential voltage corresponds to a difference between a base-emitter voltage of the first semiconductor element and a base-emitter voltage of the second semiconductor element. The amplifier has a first input terminal and a second input terminal. The first semiconductor element is connected between the first input terminal and a ground, and the second semiconductor element and the conversion resistor are connected in series between the second input terminal and the ground. The current mirror circuit controls an output current of the amplifier, and outputs a reference current corresponding to the converted current. The conversion resistor is a resistor having a temperature coefficient being on a level with a temperature coefficient of the differential voltage.

According to such a structure, it is possible to cancel out the positive temperature characteristic, in other words, the positive coefficient, and the negative temperature characteristic, in other words, the negative temperature coefficient, by adopting only the conversion resistor and the differential voltage. In other words, it is possible to cancel out the temperature characteristic of the reference current. In the above structure, there is no need to add two additional resistors to cancel out the temperature characteristics so that the circuitry size can be reduced accordingly. In the above structure, although each forward voltage or each base-emitter voltage may fluctuate, the fluctuation caused by the stress due to the differential voltage is negligibly small. In the above structure, the reference current is determined by only the resistance value of the conversion resistor and the value of the differential voltage. Thus, it is possible to generate the reference current that is less affected by a variation in stress. According to the above-mentioned structure, it is possible to enhance the precision of the reference current while suppressing an increase in the circuitry size.

The following will describe embodiments of the present disclosure with reference to the accompanying drawings. Hereinafter, in the respective embodiments, substantially the same configurations are denoted by identical symbols, and repetitive description will be omitted.

First Embodiment

Hereinafter, a first embodiment will be described with reference to FIG. 1.

As shown in FIG. 1, a reference current source 1 according to the present embodiment is a circuit that generates a reference current $I_{REF}$ with a fixed value and outputs the reference current $I_{REF}$. The reference current source 1 includes a first semiconductor element 2, a second semiconductor element 3, a resistor 4, an amplifier 5 and a current mirror circuit 6. The reference current source 1 is constructed as an IC along with a variety of circuits powered by the output reference current $I_{REF}$.

The first semiconductor element 2 includes a single PNP bipolar transistor. A collector of the first semiconductor element 2 is connected to a ground to which a reference potential of the circuit is provided, and is connected to a base of the first semiconductor element 2. The bipolar transistor included in the first semiconductor element 2 is a diode-connected transistor. An emitter of the first semiconductor element 2 is connected to a node N1.

The second semiconductor element 3 has a structure in which multiple PNP bipolar transistors are connected in parallel. In the present embodiment, P denotes the number of bipolar transistors connected in parallel in the second semiconductor element 3. P is an integer greater than or equal to 2. Each of the single bipolar transistor included in the first semiconductor element 2 and the multiple bipolar transistors included in the second semiconductor element 3 has identical size.

A collector of the second semiconductor element 3 is connected to ground, and is connected to a base of the second semiconductor element 3. The bipolar transistor included in the second semiconductor element 3 is a diode-connected transistor. An emitter of the second semiconductor element 3 is connected to a node N2 via a resistor 4. The resistor 4 functions as a conversion resistor that converts a differential voltage $\Delta V_{be}$ between a voltage $V_{be1}$ and a voltage $V_{be2}$ into a current. The voltage $V_{be1}$ is a voltage between the base and emitter of the first semiconductor element 2, and the voltage $V_{be2}$ is a voltage between the base and emitter of the second semiconductor element 3. Further, the differential voltage $\Delta V_{be}$ is expressed by the following equation (1).

$$\Delta V_{be} = V_{be1} - V_{be2} \tag{1}$$

The amplifier 5 has an inverting input terminal connected to the node N1. The inverting input terminal is one of input terminals of the amplifier 5. In other words, the first semiconductor element 2 is connected between the ground and the one of input terminals of the amplifier 5. The amplifier 5 has a non-inverting input terminal connected to the node N2. The non-inverting input terminal is another one of input terminals of the amplifier 5. In other words, the resistor 4 and the second semiconductor element 3 are connected in series between the ground and the other one of input terminals of the amplifier 5. An output terminal of the amplifier 5 is connected to a node N3.

The current mirror circuit 6 is a circuit controlling an output current of the amplifier 5, and includes three transistors Q1, Q2, and Q3. Each of the transistors Q1 to Q3 is a P-channel MOS transistor. The gates of the transistors Q1 to Q3 are commonly connected and also connected to the node N3. The sources of the transistors Q1 to Q3 are commonly connected, and are connected to a power supply line 7 to which a power supply voltage VDD is applied. The drain of the transistor Q1 is connected to the node N1, and the drain of the transistor Q2 is connected to the node N2. The drain of the transistor Q3 is connected to a node No being the output node of the reference current $I_{REF}$.

According to the above structure, due to the operation of the amplifier 5, a collector current with an identical value flows through the first semiconductor element 2 and the second semiconductor element 3, both of which have different areas. According to the above structure, the first semiconductor element 2 and the second semiconductor element 3 operate with different current densities. At this time, the voltage of a terminal of the resistor 4 on a low-potential side reaches a voltage $V_{be2}$ and the voltage of another one terminal of the resistor 4 on a high-potential side reaches a voltage $V_{be1}$. As a result, the voltage between the terminals of the resistor 4 reaches the differential voltage $\Delta V_{be}$. Therefore, the differential voltage $\Delta V_{be}$ is converted into a current by the resistor 4.

The drain current of each of the transistors Q1 to Q3 included in the current mirror circuit 6 corresponds to a current converted by the resistor 4 as described above. According to the reference current source 1 having the above structure, a current corresponding to the current converted by the resistor 4 is output as the reference current $I_{REF}$. In the present embodiment, the resistor 4 has a temperature characteristic being on a level with a temperature characteristic of the differential voltage $\Delta V_{be}$, and is specifically formed of, for example, a silicide poly resistor or a diffusion resistor.

The following describes a mechanism for canceling the temperature characteristic of the reference current $I_{REF}$ generated by the reference current source 1 having the above structure. The temperature characteristic of the differential voltage $\Delta V_{be}$ and the temperature characteristic of the resistor 4 are expressed by the following equations (2) and (3), respectively, where: $T_0$ denotes an arbitrary temperature; $\Delta V_{be0}$ denotes the differential voltage $\Delta V_{be}$ at temperature $T_0$; R denotes the resistance value of resistor 4; $R_0$ denotes the resistance value R at temperature $T_0$; and α and β denote the temperature coefficients.

$$\Delta V_{be} = \Delta V_{be0}(1 + \alpha(T - T_0)) \quad (2)$$

$$R = R_0(1 + \beta(T - T_0)) \quad (3)$$

The reference current $I_{REF}$ in the above structure is determined by the differential voltage $\Delta V_{be}$ and the resistance value R of the resistor 4, as expressed by the following equation (4). Based on the above equations (2) and (3), the reference current $I_{REF}$ can be expressed as shown in the following equation (5).

$$I_{REF} = \frac{\Delta V_{be}}{R} \quad (4)$$

$$I_{REF} = \frac{\Delta V_{be}(1 + \alpha(T - T_0))}{R_0(1 + \beta(T - T_0))} \approx \frac{\Delta V_{be0}}{R_0}(1 + \alpha(T - T_0))(1 - \beta(T - T_0)) \approx \frac{\Delta V_{be0}}{R_0}(1 + \alpha(T - T_0) - \beta(T - T_0)) \quad (5)$$

Here, the temperature coefficient α of the differential voltage $\Delta V_{be}$ has a value of about 0.33%/K, as shown in the following equation (6). The temperature coefficient β of the resistor 4 is approximately 0.3%/K, although it depends on the type of the silicide resistor.

$$\frac{\partial \Delta V_{be}}{\partial T} \approx \frac{0.33\%}{K} \quad (6)$$

In the above structure, the value of the temperature coefficient α and the value of the temperature coefficient β are approximately the same. If the temperature coefficients α and β have the same value, the temperature-dependent term "$\alpha(T-T_0)-\beta(T-T_0)$" in the above equation (6) can be set to zero. Therefore, the reference current $I_{REF}$ is a current that is not affected by temperature. According to the above structure, it is possible to cancel the temperature characteristics of the reference current $I_{REF}$.

According to the present embodiment described above, the following effects are obtained. The silicide resistor may have a relatively low area efficiency and a relatively large variation due to a relatively low sheet resistance value, so that the silicide may not be normally used. However, the silicide resistor has the advantage that its temperature characteristic is the closest to the temperature characteristic of the differential voltage $\Delta V_{be}$. In view of the above consideration, a silicide resistor is used as the resistor 4 being a conversion resistor for converting the differential voltage $\Delta V_{be}$ into a current in the reference current source 1 according to the present embodiment. In other words, the resistor 4 is a resistor having the temperature characteristic being on a level with the temperature characteristic of the differential voltage $\Delta V_{be}$.

In the reference current source 1 according to the present embodiment, it is possible to cancel out the positive temperature characteristic and the negative temperature characteristic by only the characteristic of the resistor 4 and the characteristic of the differential voltage $\Delta V_{be}$, and it is possible to reduce the temperature characteristic of the reference current $I_{REF}$. In the reference current source 1 according to the present embodiment, it is not necessary to add other two resistors to cancel out the temperature characteristics so that it is possible to reduce the circuitry size accordingly.

In the reference current source 1 according to the present embodiment, it is possible that the voltages $V_{be1}$, $V_{be2}$ vary due to a change in the reverse saturation currents of the first semiconductor element 2 and the second semiconductor element 3 through stress. According to the reference current source 1 of the present embodiment, the differential voltage $\Delta V_{be}$ is determined from the difference between the voltages $V_{be1}$ and $V_{be2}$, so if there is no difference between the respective reverse saturation currents, the stress fluctuation will be extremely small. In the reference current source 1 according to the present embodiment, since the reference current $I_{REF}$ is determined only by the resistance value R of the resistor 4 and the value of the differential voltage $\Delta V_{be}$, it is possible to generate the reference current $I_{REF}$ which is less affected by fluctuations due to stress. According to the present embodiment, it is possible to enhance the precision of the reference current $I_{REF}$ while suppressing an increase in the circuitry size as an advantageous effect.

Second Embodiment

Figure 2:
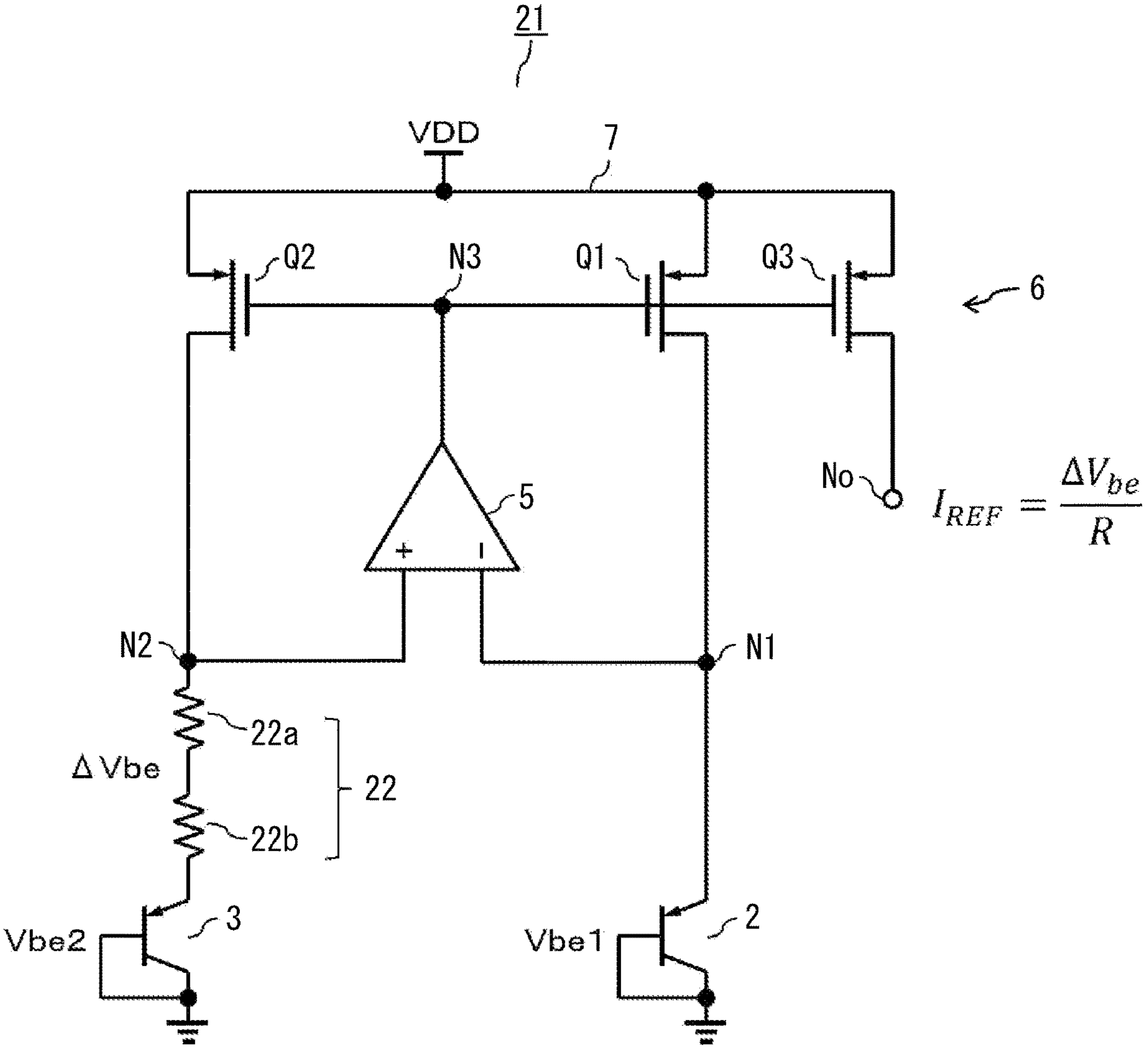
FIG. 2 schematically shows a configuration of a reference current source according to a second embodiment.

A second embodiment will hereinafter be described with reference to FIGS. 2, 3. As shown in FIG. 2, a reference current source 21 according to the present embodiment is different from the reference current source 1 according to the first embodiment as shown in FIG. 1, such that the reference current source 21 includes a resistor 22 in replacement of the resistor 4. The resistor 22 is a combination of two resistors 22*a*, 22*b*, specifically a series circuit in which the two resistors 22*a* and 22*b* are connected in series. The resistor 22*a* is a resistor having a temperature characteristic being on a level with the temperature characteristic of the differential voltage $\Delta V_{be}$, and is specifically formed of a silicide poly resistor. The resistor 22*b* is a resistor having a temperature characteristic being on a level with the temperature characteristic of the differential voltage $\Delta V_{be}$, and is specifically formed of a silicide diffusion resistor.

The temperature coefficient 31 of the resistor 22*a*, which is one of the two resistors 22*a* and 22*b*, is about 0.28%/K, which is smaller than the temperature coefficient α of the differential voltage $\Delta V_{be}$. In other words, the resistor 22*a* has a temperature characteristic that is greater than the temperature characteristic of the differential voltage $\Delta V_{be}$ in the negative direction. Further, the temperature coefficient 32 of the resistor 22*b*, which is the other of the two resistors 22*a* and 22*b*, has a value of about 0.335%/K, which is a value larger than the temperature coefficient α of the differential voltage $\Delta V_{be}$. In other words, the resistor 22*b* has a temperature characteristic that is greater than the temperature characteristic of the differential voltage $\Delta V_{be}$ in the positive direction.

The following describes a mechanism for canceling out the temperature characteristics of the reference current $I_{REF}$ generated by the reference current source 21 having the above structure. The temperature characteristic of the resistor 22 is expressed by the following equation (7), where: R denotes the resistance value of the resistor 22; $R_{10}$ denotes the resistance value of the resistor 22*a* at the temperature $T_0$; and $R_{20}$ denotes the resistance value of the resistor 22*b* at the temperature $T_0$.

$$R = R_{10}(1+\beta_1(T-T_0)) + R_{20}(1+\beta_2(T-T_0)) \tag{7}$$

The reference current $I_{REF}$ in the above structure is determined by the differential voltage $\Delta V_{be}$ and the resistance value R of the resistor 4, as expressed by the equation (4) as in the first embodiment. Based on the above equation (7), the reference current $I_{REF}$ can be expressed as shown in the following equation (8).

$$I_{REF} = \frac{\Delta V_{be0}(1+\alpha(T-T_0))}{R_{10}(1+\beta_1(T-T_0)) + R_{20}(1+\beta_2(T-T_0))} \approx \frac{\Delta V_{be0}}{R_{10}+R_{20}} \tag{8}$$

If the resistors 22*a* and 22*b* are selected so that the above equation (8) can be modified to eliminate the temperature-dependent term, the reference current $I_{REF}$ becomes a current that does not change along with the temperature. According to the above structure, it is possible to cancel out the temperature characteristics of the reference current $I_{REF}$ with high precision.

In the reference current source 21 according to the present embodiment, the resistor 22 being a conversion resistor for converting the differential voltage $\Delta V_{be}$ into a current includes a combination of the two resistors 22*a* and 22*b* having temperature characteristics being on a level with the temperature characteristic of the differential voltage $\Delta V_{be}$. In this case, the resistor 22*a* has a temperature characteristic that is relatively large in the negative direction with respect to the temperature characteristic of the differential voltage $\Delta V_{be}$, and the resistor 22*b* has a temperature characteristic that is relatively large in the positive direction with respect to the differential voltage $\Delta V_{be}$. According to such a structure, it is possible to further enhance the advantageous effect of canceling out the temperature characteristics as compared with a situation in which a single silicide resistor is used as the conversion resistor. The following describes the reasons.

In a case where a single silicide resistor is used as the conversion resistor, if the temperature characteristic of the single silicide resistor does not completely match the temperature characteristic of the differential voltage $\Delta V_{be}$. the temperature characteristic corresponding to the discrepancy may appear in the reference current $I_{REF}$. For example, in a case where the resistor 22*a* being a single silicide poly resistor is adopted as the conversion resistor, the reference current $I_{REF}$ has a positive temperature characteristic that increases as the temperature increases as shown by a dotted line in FIG. 3.

Figure 3:
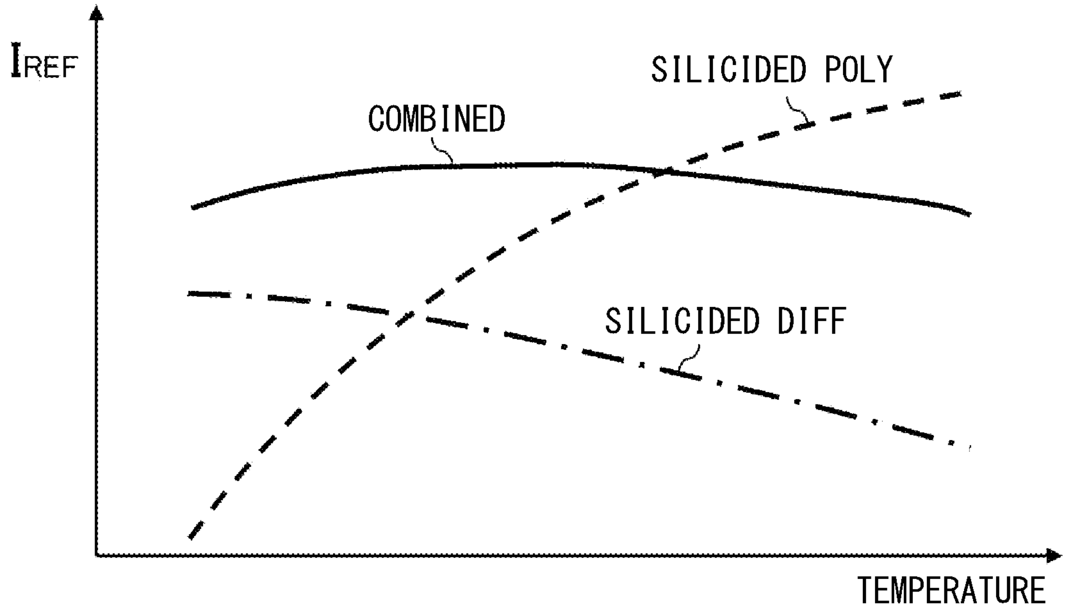
FIG. 3 shows an example of a temperature characteristic of a reference current in a case where a single resistor is used as a conversion resistor according to the second embodiment and in a case where two resistors are used as the conversion resistor.

For example, in a case where the resistor 22*b* being a single silicide diffusion resistor is adopted as the conversion resistor, the reference current $I_{REF}$ has a negative temperature characteristic that decreases as the temperature increases as shown by a dotted line in FIG. 3. In contrast, in a case where the resistor 22 being the conversion resistor has a combination of two silicide resistors 22*a*, 22*b*, the reference current $I_{REF}$ almost has no change depending on the temperature. Therefore, it is possible to almost completely cancel out the temperature characteristics that would appear when the conversion resistor has a single resistor 22*a* or a single resistor 22*b*.

In the present embodiment, the resistor 22 being the conversion resistor includes a series circuit in which the two resistors 22*a* and 22*b* are connected in series. Therefore, it is possible to reduce the resistance value of the resistor 22 as compared with a situation in which the resistor 22 being the conversion resistor includes a parallel circuit in which the two resistors 22*a* and 22*b* are connected in parallel.

Third Embodiment

Figure 4:
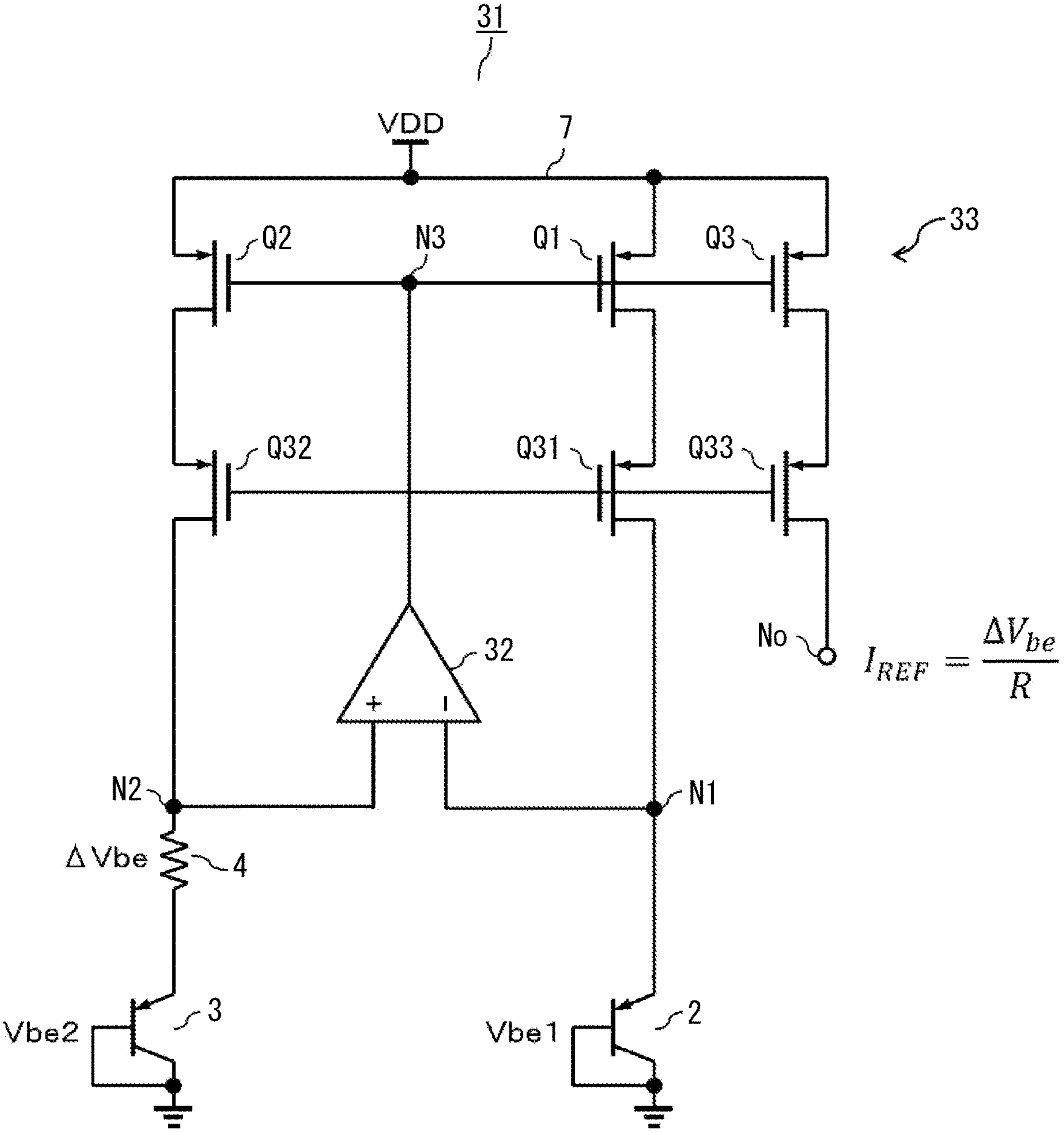
FIG. 4 schematically shows a configuration of a reference current source according to a third embodiment.

A third embodiment will be described below with reference to FIG. 4. As shown in FIG. 4, the reference current source 31 according to the present embodiment is different from the reference current source 1 according to the first embodiment as shown in FIG. 1, such that: the reference current source 31 includes an amplifier 32 in replacement of the amplifier 5; the reference current source 31 includes a current mirror circuit 33 in replacement of the current mirror circuit 6; and the like.

The amplifier 32 is a chopper amplifier having a chopping function, and is supplied with a clock signal fcp as its operating clock. The amplifier 32 modulates the polarity of the input signal by alternately inverting the input signal using the clock signal fcp, and converts the input signal band into a clock frequency band. In the amplifier 32, the amplified signal is demodulated into the original input signal band by alternately inverting the polarity using the clock signal fcp.

In addition to the structure included in the current mirror circuit 6, the current mirror circuit 33 includes three transistors Q31, Q32, Q33. Transistors Q31 to Q33 are all P-channel MOS transistors. The gates of transistors Q31 to Q33 are commonly connected. The drain of the transistor Q1 is connected to the node N1 via the source and drain of the transistor Q31.

The drain of the transistor Q2 is connected to the node N2 via the source and drain of the transistor Q32. The drain of the transistor Q3 is connected to the node No via the source and drain of the transistor Q33. The node No is the output node of the reference current $I_{REF}$. The current mirror circuit 33 has a cascode-connected structure.

Since the offset component caused by factors such as transistor mismatch has a temperature characteristic, the precision of the reference current $I_{REF}$ may decrease due to the offset component. In the reference current source 31 according to the present embodiment, a chopper amplifier having a chopping function is used as the amplifier 32. According to such a structure, the chopping function of the amplifier 32 removes the offset component, so that the precision of the reference current $I_{REF}$ can be further enhanced.

Fourth Embodiment

Figure 5:
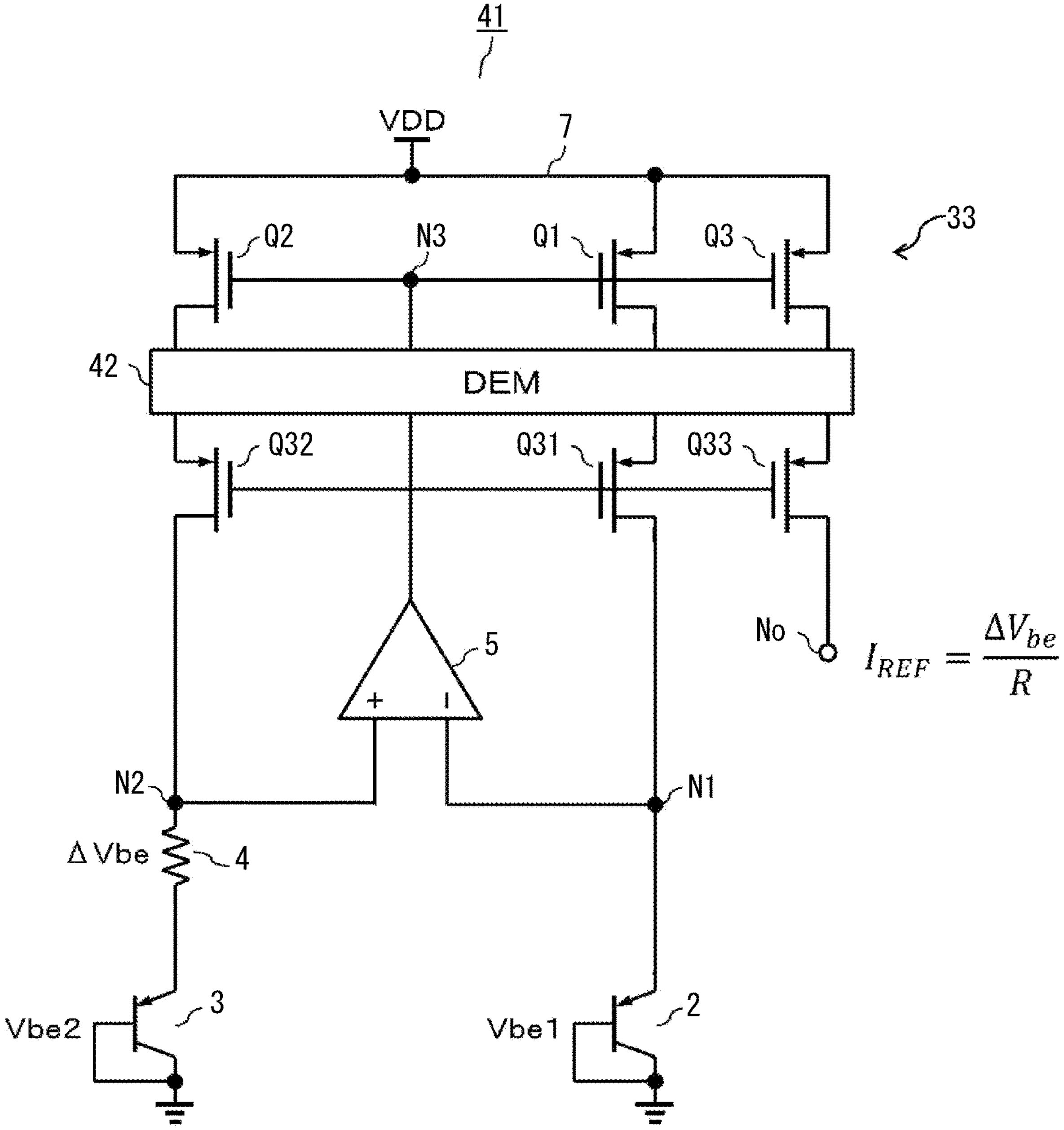
FIG. 5 schematically shows a configuration of a reference current source according to a fourth embodiment.

A fourth embodiment will be described below with reference to FIG. 5. As shown in FIG. 5, a reference current source 41 is different from the reference current source 1 according to the first embodiment shown in FIG. 1, such that the reference current source 41 includes: the current mirror circuit 33 described in the third embodiment in replacement of the current mirror circuit 6; and a dynamic element matching (DEM) circuit 42 that is additionally provided.

The DEM circuit 42 includes, for example, multiple switches so that it is possible to correct a variation component of the current mirror circuit 33 by switching on and off the multiple switches. The DEM circuit 42 is provided in the current mirror circuit 33 so as to be interposed between the transistors Q1 to Q3 and the transistors Q31 to Q33. The DEM circuit 42 can also be provided so as to be interposed between the transistors Q31 to Q33 and the nodes N1, N2, and No.

The reference current source 41 according to the present embodiment includes the DEM circuit 42 that corrects the variation component of the current mirror circuit 33. According to such a structure, since the DEM circuit 42 enhances the degree of coincidence of each output current of the current mirror circuit 33, the precision of the reference current $I_{REF}$ can be further enhanced.

Fifth Embodiment

Figure 6:
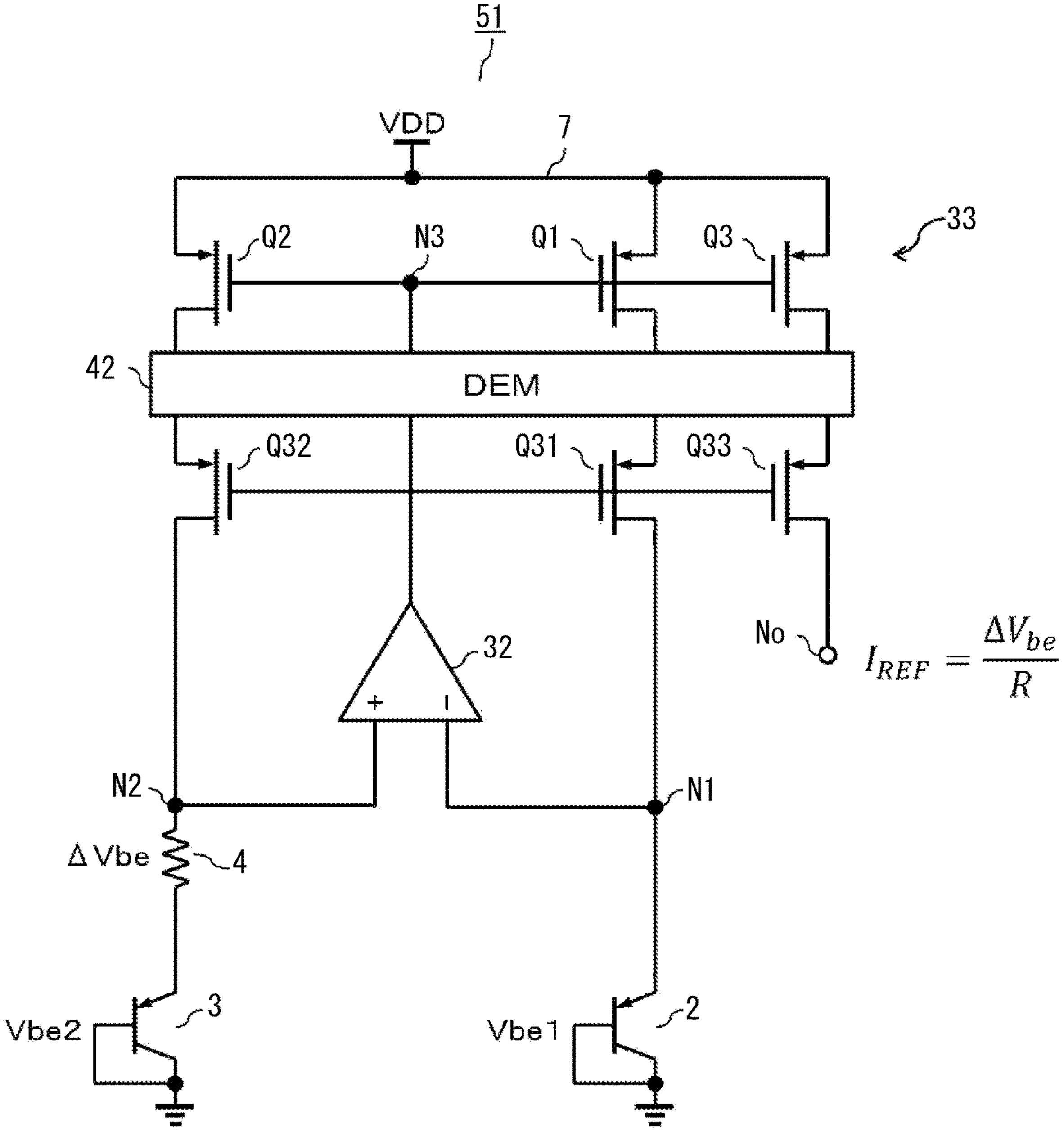
FIG. 6 schematically shows a configuration of a reference current source according to a fifth embodiment.

Hereinafter, a fifth embodiment will be described with reference to FIG. 6. As shown in FIG. 6, a reference current source 51 according to the present embodiment is different from the reference current source 41 according to the fourth embodiment, such that the reference current source 51 according to the present embodiment includes the amplifier 32 described in the third embodiment in replacement of the amplifier 5. According to such a structure, the chopping function of the amplifier 32 removes the offset component, and the DEM circuit 42 enhances the degree of coincidence among the output currents of the current mirror circuit 33. Therefore, it is possible to enhance the precision of the reference current $I_{REF}$.

OTHER EMBODIMENTS

The present disclosure is not limited to the embodiments that have been described above and illustrated in the drawings, but can arbitrarily be modified, combined, or expanded without departing from the gist of the present disclosure. The numerical values and the like illustrated in each of the above embodiments are merely examples, and the present disclosure is not limited thereto. The conversion resistor is not limited to the resistor 4 which is a silicide resistor, but may be any resistor such as a wiring resistor having temperature characteristics comparable to the differential voltage $\Delta V_{be}$.

The first embodiment describes that the collector currents having identical values respectively flow to the first semiconductor element 2 and the second semiconductor element 3 having different area ratios. However, it is possible that collector currents with different values respectively flow through the first semiconductor element and the second semiconductor element having the areas with identical values.

The first embodiment describes that a device having a PNP bipolar transistor connected to a single diode is adopted as the first semiconductor element 2 while a device having multiple PNP bipolar transistors connected in parallel is adopted as the second semiconductor element 3. However, it is possible to have the following structure. A device having an NPN bipolar transistor connected to a single diode may be adopted as the first semiconductor element 2 while a device having multiple NPN bipolar transistors connected in parallel may be adopted as the second semiconductor element 3. It is possible to adopt a device having a single diode as the first semiconductor element while a device having multiple diodes connected in parallel as the second semiconductor element. In this case, the conversion resistor converts the differential voltage, which is the difference between the forward voltage of the first semiconductor element and the forward voltage of the second semiconductor element.

Although the present disclosure has been described in accordance with the embodiments, it is understood that the present disclosure is not limited to such embodiments and structures. The present disclosure encompasses various modifications and variations within the scope of equivalents. Furthermore, various combination and formation, and other combination and formation including one, more than one or less than one element may be made in the present disclosure.

What is claimed is:

1. A reference current source comprising:

a first semiconductor element including a single diode or a single diode-connected bipolar transistor;

a second semiconductor element including a plurality of diodes being connected in parallel or a plurality of diode-connected bipolar transistors being connected in parallel, a conversion resistor configured to convert a differential voltage into a converted current, the differential voltage corresponding to

- a difference between a base-emitter voltage of the first semiconductor element and a base-emitter voltage of the second semiconductor element, or
- a difference between a forward voltage of the first semiconductor element and a forward voltage of the second semiconductor element;

an amplifier having a first input terminal and a second input terminal, the first semiconductor element being connected between the first input terminal and a ground, the second semiconductor element and the conversion resistor being connected in series between the second input terminal and the ground; and a current mirror circuit configured to control an output current of the amplifier, and output a reference current corresponding to the converted current, wherein the conversion resistor has a temperature coefficient being on a level with a temperature coefficient of the differential voltage, the conversion resistor includes a combination of at least two resistors, a temperature coefficient of one of the two resistors is smaller than the temperature coefficient of the differential voltage, a temperature coefficient of another one of the two resistors is larger than the temperature coefficient of the differential voltage, and the one of the two resistors is a silicide poly resistor, and the other one of the two resistors is a silicide diffusion resistor.

2. The reference current source according to claim 1, wherein the amplifier is a chopper amplifier configured to execute a chopping operation.

3. The reference current source according to claim 1, further comprising:

a dynamic element matching circuit configured to correct a variation component of the current mirror circuit.

4. The reference current source according to claim 2, further comprising:

a dynamic element matching circuit configured to correct a variation component of the current mirror circuit.

* * * * *